(12) United States Patent
Kim

(10) Patent No.: US 8,862,364 B2
(45) Date of Patent: Oct. 14, 2014

(54) METHODS AND SYSTEMS FOR TURBINE LINE REPLACEABLE UNIT FAULT DETECTION AND ISOLATION DURING ENGINE STARTUP

(71) Applicant: Honeywell International Inc., Morristown, NJ (US)

(72) Inventor: Kyusung Kim, Plymouth, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/787,687

(22) Filed: Mar. 6, 2013

(65) Prior Publication Data
US 2013/0173135 A1  Jul. 4, 2013

Related U.S. Application Data

(63) Continuation of application No. 12/509,155, filed on Jul. 24, 2009, now Pat. No. 8,467,949.

(60) Provisional application No. 61/182,519, filed on May 29, 2009.

(51) Int. Cl.
*G01M 15/14* (2006.01)
*G05B 23/02* (2006.01)
*F02C 7/26* (2006.01)

(52) U.S. Cl.
CPC ............ *G01M 15/14* (2013.01); *G05B 23/0235* (2013.01); *F05D 2260/85* (2013.01); *F05D 2260/80* (2013.01); *F02C 7/26* (2013.01)
USPC ............... 701/100; 701/54; 701/63; 701/107; 701/113; 340/4.32; 340/539.1; 340/945; 340/959

(58) Field of Classification Search
CPC ...... F02C 7/26; G05B 23/0235; G01M 15/14; F05D 2260/85; F05D 2260/80
USPC ...................... 701/35, 54, 100, 107, 113, 63; 340/4.32, 539.1, 945, 959
See application file for complete search history.

(56) References Cited

U.S. PATENT DOCUMENTS 4,456,831 A  6/1984  Kanegae et al.
4,525,783 A  6/1985  Pischke et al.
(Continued)

OTHER PUBLICATIONS

USPTO Notice of Allowance and Fee(s) Due, U.S. Appl. No. 12/509,155 date mailed Mar. 15, 2013.
(Continued)

*Primary Examiner* — John R Olszewski
*Assistant Examiner* — Truc M Do
(74) *Attorney, Agent, or Firm* — Ingrassia Fisher & Lorenz P.C.

(57) ABSTRACT

Systems and methods for isolating a performance anomaly within one or more line replaceable units (LRUs) on a gas turbine engine by monitoring the start up transient are presented. The system comprises a set of sensors, an anomaly detector and a fault isolation reasoner. Each sensor of the set monitors at least one operating parameter of at least one engine component. The anomaly detector is configured to detect an anomaly in a component by comparing a particular value of an operating parameter to a base line value of that parameter. The specific cause of the startup anomaly is isolated utilizing a set of component reasoners that is based on the nature of the detected anomaly. The key events during the engine startup are identified by the combination of monitoring physically relevant phases of a startup and monitoring the engine control schedule. The values at these key events are used for comparing at the anomaly detector.

10 Claims, 17 Drawing Sheets

(56) References Cited

U.S. PATENT DOCUMENTS

| | | | |
|---|---|---|---|
| 4,627,234 A | 12/1986 | Schuh | |
| 4,908,618 A * | 3/1990 | Baker et al. | 340/945 |
| 5,428,275 A | 6/1995 | Carr et al. | |
| 5,718,111 A | 2/1998 | Ling et al. | |
| 6,035,626 A | 3/2000 | Wahl et al. | |
| 6,134,875 A * | 10/2000 | Massey | 60/788 |
| 6,282,882 B1 | 9/2001 | Dudd et al. | |
| 6,343,251 B1 | 1/2002 | Herron et al. | |
| 6,393,355 B1 * | 5/2002 | Muramatsu | 701/100 |
| 6,470,258 B1 * | 10/2002 | Leamy et al. | 701/100 |
| 6,498,978 B2 * | 12/2002 | Leamy et al. | 701/100 |
| 6,719,526 B2 | 4/2004 | Sanborn et al. | |
| 6,819,999 B2 | 11/2004 | Hartzheim | |
| 6,823,253 B2 | 11/2004 | Brunell | |
| 6,894,611 B2 * | 5/2005 | Butz et al. | 340/539.1 |
| 6,941,217 B1 | 9/2005 | Munson, Jr. | |
| 6,958,550 B2 * | 10/2005 | Gilbreth et al. | 290/52 |
| 7,020,595 B1 | 3/2006 | Adibhatla et al. | |
| 7,043,348 B2 | 5/2006 | Uluyol et al. | |
| 7,062,370 B2 | 6/2006 | Vhora et al. | |
| 7,197,430 B2 | 3/2007 | Jacques et al. | |
| 7,369,932 B2 | 5/2008 | Kim et al. | |
| 7,506,517 B2 | 3/2009 | Uluyol et al. | |
| 7,513,119 B2 * | 4/2009 | Zielinski et al. | 60/778 |
| 7,571,045 B2 * | 8/2009 | Muramatsu et al. | 701/100 |
| 7,664,590 B2 * | 2/2010 | Runkle et al. | 701/100 |
| 7,755,512 B2 * | 7/2010 | Ziarno | 340/945 |
| 7,840,333 B2 * | 11/2010 | Mehrer et al. | 701/100 |
| 7,840,336 B2 * | 11/2010 | Muramatsu et al. | 701/114 |
| 7,930,928 B2 * | 4/2011 | Ruston | 73/112.01 |
| 8,467,949 B2 * | 6/2013 | Kim | 701/100 |
| 2002/0173897 A1 * | 11/2002 | Leamy et al. | 701/100 |
| 2002/0198648 A1 * | 12/2002 | Gilbreth et al. | 701/100 |
| 2003/0110777 A1 * | 6/2003 | O'Connor | 60/778 |
| 2003/0217021 A1 * | 11/2003 | Jacobson | 706/16 |
| 2004/0148940 A1 | 8/2004 | Venkateswaran et al. | |
| 2004/0176901 A1 | 9/2004 | Uluyol et al. | |
| 2005/0209767 A1 | 9/2005 | Kim et al. | |
| 2005/0222747 A1 * | 10/2005 | Vhora et al. | 701/100 |
| 2006/0056959 A1 | 3/2006 | Sabol et al. | |
| 2006/0086094 A1 * | 4/2006 | Runkle et al. | 60/779 |
| 2006/0195248 A1 | 8/2006 | Kim et al. | |
| 2006/0201158 A1 | 9/2006 | Venkateswaran et al. | |
| 2006/0254282 A1 * | 11/2006 | Riley | 60/773 |
| 2006/0287778 A1 | 12/2006 | Oltheten et al. | |
| 2007/0051111 A1 | 3/2007 | Uluyol et al. | |
| 2007/0055435 A1 * | 3/2007 | Muramatsu et al. | 701/100 |
| 2007/0088982 A1 | 4/2007 | Guralnik et al. | |
| 2007/0234734 A1 | 10/2007 | Uluyol et al. | |
| 2007/0245744 A1 * | 10/2007 | Dooley | 60/772 |
| 2007/0245745 A1 * | 10/2007 | Davies et al. | 60/778 |
| 2007/0260390 A1 | 11/2007 | Kim et al. | |
| 2008/0052049 A1 * | 2/2008 | Moriyama et al. | 703/2 |
| 2008/0228370 A1 * | 9/2008 | Runkle et al. | 701/100 |
| 2008/0256954 A1 * | 10/2008 | Dooley | 60/733 |
| 2008/0271461 A1 * | 11/2008 | Terlecki et al. | 60/790 |
| 2009/0051219 A1 * | 2/2009 | Kern et al. | 307/9.1 |
| 2009/0069998 A1 * | 3/2009 | Mehrer et al. | 701/100 |
| 2009/0192700 A1 * | 7/2009 | Votoupal et al. | 701/113 |
| 2010/0043540 A1 * | 2/2010 | Ruston | 73/112.01 |
| 2010/0162718 A1 * | 7/2010 | Bowman | 60/773 |
| 2010/0164428 A1 * | 7/2010 | Xu et al. | 318/767 |
| 2010/0293960 A1 * | 11/2010 | Davies et al. | 60/778 |
| 2010/0303611 A1 * | 12/2010 | Kim | 415/118 |
| 2011/0010069 A1 * | 1/2011 | Payne et al. | 701/100 |
| 2011/0040470 A1 * | 2/2011 | Qiu et al. | 701/100 |

OTHER PUBLICATIONS

Onder Uluyol, Kyusung Kim and Emmanuel O. Nwadiogbu, Synergistic Use of Soft Computing Technologies for Fault Detection in Gas Turbine Engines, IEEE Transactions on Systems, Man, and Cybernetics—Part C: Applications and Reviews, vol. 36, No. 4, Jul. 2006, pp. 476-484.

Vellore P. Surender and Ranjan Ganguli, Adaptive Myriad Filter for Improved Gas Turbine Condition Monitoring Using Transient Data, Journal of Engineering for Gas Turbines and Power, Apr. 2005, vol. 127, pp. 329-339.

* cited by examiner

METHODS AND SYSTEMS FOR TURBINE LINE REPLACEABLE UNIT FAULT DETECTION AND ISOLATION DURING ENGINE STARTUP

PRIORITY STATEMENT

This continuation application claims priority under 35 U.S.C. §120 from co-owned, co-pending U.S. patent application Ser. No. 12/509,155 filed Jul. 24, 2009, which in turn claims priority from U.S. provisional patent application 61/182,519 filed May 29, 2009. U.S. patent application Ser. No. 12/509,155 is hereby incorporated by reference it its entirety.

STATEMENT REGARDING FEDERALLY SPONSORED RESEARCH OR DEVELOPMENT

This invention was made with Government support under Contract W911W6-08-C-0002 awarded by the United States Army's Aviation Applied Technology Directorate, Ft. Eustis, Va. The Government has certain rights in this invention.

BACKGROUND

The gas turbine engine is a vital aviation component. While the heart of this propulsion system is the turbine that converts fuel into mechanical energy, several add on Line Replaceable Units ("LRU") contribute to the overall health and remaining useful life of the engine. Although some LRUs may not be considered to be engine original equipment manufacturer (OEM) parts, they nevertheless contribute to the prognostic health of the propulsion system. Consequently, any accurate estimate of remaining useful life from a maintenance perspective should account for all such LRUs.

Current LRU fault detection is achieved using built-in-tests (BIT). Unfortunately, BIT merely implements simple threshold checks (i.e., hard faults) without taking a systems perspective of the LRU's impact on the propulsion system. Significant maintenance effort is expended to troubleshoot and isolate in-range (i.e., soft) faults. As a result, in the unlikely event that the component finally fails the result may be an engine shutdown or loss of power control.

A failed LRU can drive maintenance costs and operational interrupts up in two ways: 1) an LRU failure may be misdiagnosed as an engine problem causing the engine to be removed unnecessarily, and 2) the engine must be removed to gain access certain LRUs merely to perform physical maintenance and testing.

Further, most turbine engine fault diagnosis methods are developed with engine performance models that have been validated only under steady-state conditions or with actual engine data at steady-state conditions. Engine models that accurately represent the system in transient conditions are difficult to develop.

Nevertheless, developing fault diagnosis methods designed to operate during transient as well as steady-state operation has several important advantages: (a) certain system faults have a distinct signature during system transient conditions that would not normally be discernible during steady-state conditions; (b) the effect of feedback control action is less dominant during transient conditions than during steady-state conditions, therefore sensor and system faults are more evident during transient conditions; and (c) certain engine component incipient faults are manifest only during transient conditions such as start-up and shutdown (e.g. starter and igniter system faults). Therefore, a more robust approach to developing fault diagnosis methods that explicitly account for transient data is required.

BRIEF SUMMARY

A method for detecting deterioration in an engine component is provided including steps for monitoring an engine control unit for the execution of a command associated with an occurrence of a start up event and recording an engine performance parameter value associated with the event at the time the command is executed. The method then compare the recorded engine parameter value with a baseline engine parameter value indicating a normal event and determines if the recorded engine parameter value is materially different than the baseline engine parameter value within a predefined standard. If the recorded engine parameter value is materially different that the baseline engine parameter value an anomaly indicator is generated.

A system for isolating a performance anomaly within one or more engine components is provided and comprises a set of sensors, an anomaly detector and a fault isolation reasoner. Each sensor of the set monitors at least one operating parameter of at least one engine component. The anomaly detector detects an anomaly in the engine component by comparing a particular value of the at least one operating parameter to a base line feature value. The fault isolation reasoner disambiguates a cause of the anomaly in the engine component by utilizing a set of component reasoners based on the nature of the detected anomaly.

BRIEF DESCRIPTION OF THE DRAWINGS

The various embodiments of the invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The following disclosure details a feature extraction method characterizing gas turbine engine dynamics. The extracted features are used as inputs for a fault diagnosis and prognosis method for the startup related sub-systems in gas turbine engines, specifically, the starter system, the ignition system and the fuel delivery system. The subject matter disclosed herein focuses on monitoring and analyzing the parameters prominent during various stages of a gas turbine engine start up process thereby allowing the monitoring of multiple Line Replaceable Units (LRU) that are dominant at some point in the engine start up during the startup transient.

The proper startup of a gas turbine engine from ignition to idle speed is important not only for achieving a fast and efficient startup without incurring stall, but also for health monitoring of the subsystems involved. During startup, an engine goes through a number of phases during which the performance of various components become dominant. The subject matter disclosed herein physically monitors the relevant phases of a startup by detecting subtle but distinct changes in engine behavior which manifests themselves in such parameters as the engine speed (N2) and the measured gas temperature (MGT).

The startup process includes several transient events, such as starter-on, light-off, peak gas temperature, and idle. As each of these events is reached, different engine components come into play and the dynamic response of the engine changes. Monitoring N2, MGT and their derivatives provides valuable insights into LRU behavior during the start up transient. Additional information concerning the monitoring of the start up process of a gas turbine engine may be found in co-owned U.S. Pat. No. 7,506,517 to Uluyol and co-owned, co-pending U.S. patent application Ser. No. 11/058,061 to Kim, each of which is herein incorporated by reference in its entirety.

Figure 1:
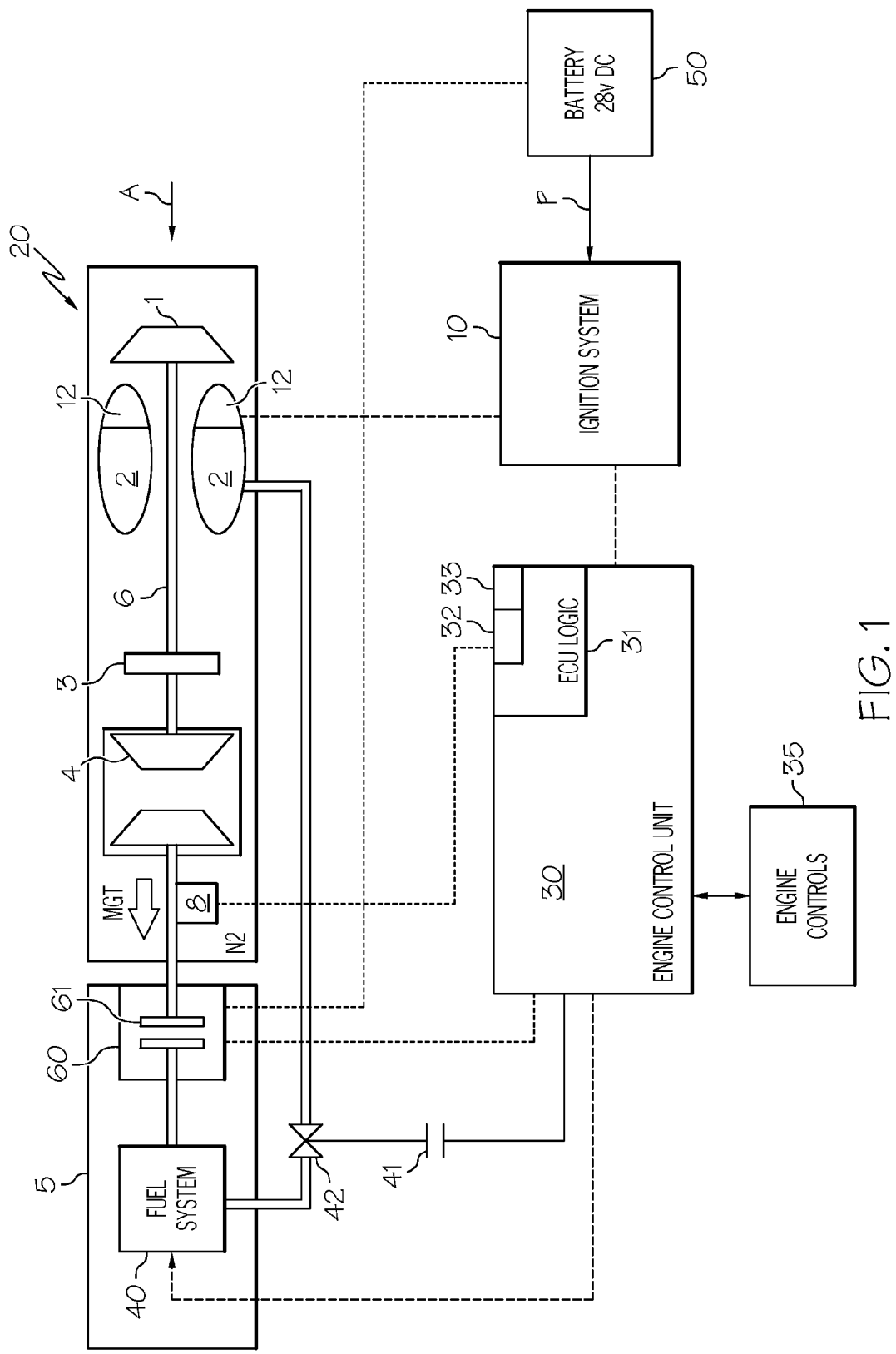
FIG. 1 illustrates a simplified block diagram of a gas turbine engine.

Gas turbine engines are complicated pieces of machinery, so fault diagnosis of these machines is enhanced by a detailed understanding of the equipment. An exemplary non-limiting type of gas turbine engine may be a turbo-shaft gas turbine engine. A simplified block diagram of a turbo shaft gas turbine engine and its peripheral equipment is provided in FIG. 1.

A turbo-shaft gas turbine 20 drives a compressor 1. Air flow (A) from the compressor 1 is directed through an annular combustor 2 where it is mixed with fuel for combustion. Resulting combustion gases are forced through a single-stage turbine 3 and then through a single-stage free power turbine 4. Output power from the rotating power turbine shaft 6 is transmitted to a front-mounted reduction gearbox 5 via the power turbine shaft 6. The power turbine shaft 6 is supported by a forward thrust bearing and an aft roller bearing (not shown). The tachometer 8 measures N2.

The engine ignition system 10 for the gas turbine engine 20 requires an external source of power (P) to drive a set of igniters 12. The igniters 12 may be powered by a 28 Vdc battery 50 when the starter is energized and may operate on an input voltage range of 10 through 30 Vdc. The battery 50 supplies energy for an igniter spark at the igniters 12. Each separate igniter 12 releases sufficient energy for all ground and air starting requirements and should function satisfactorily throughout start up transient in all environmental conditions and the entire operating envelope of the engine.

Figure 2:
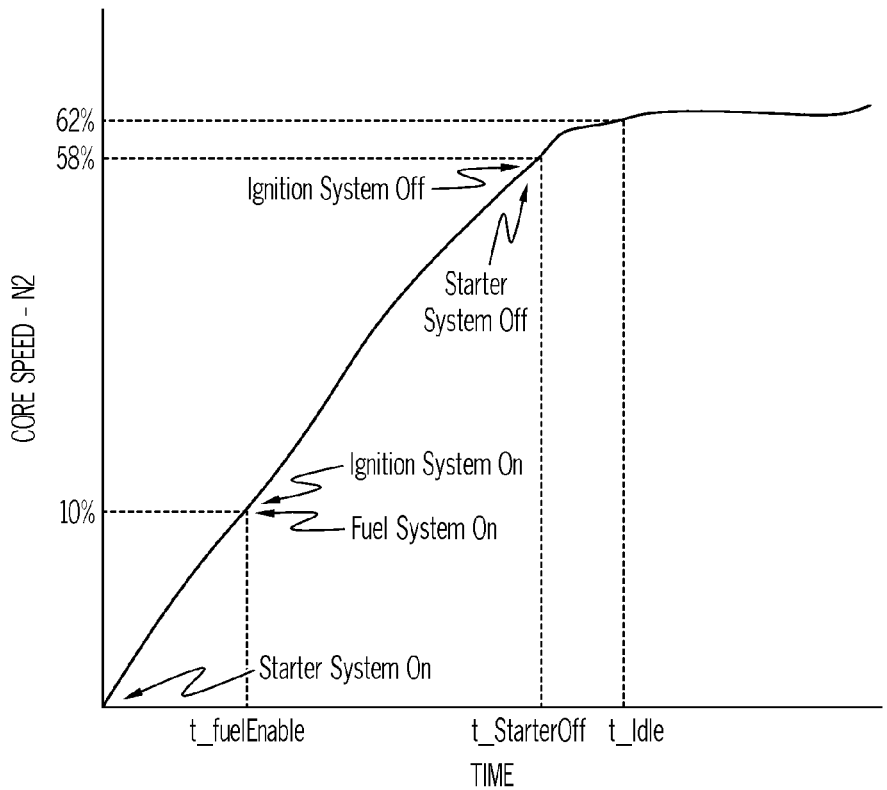
FIG. 2 illustrates a typical engine core speed startup profile over time of a gas turbine.

An exemplary start up transient is presented in FIG. 2 as a graph of N2 vs. time. The corresponding start up procedure is partitioned in FIG. 3 according to the various Line Replaceable Units (LRUs) involved during the start up transient.

To start the gas turbine engine 20, an automatic start sequence is enabled by the pilot by placing engine controls 35 in an IDLE position and manipulating a start switch (not shown) which applies power to the starter system 60 to begin rotation of the turbine shaft 6 via the starter motor 61. Given sufficient power (P), the turbine shaft 6 (i.e. the engine core) will begin to accelerate with the ignition system 10 enabled. As the turbine shaft 6 accelerates, the Engine Control Logic (ECU Logic) 31 within the Engine Control Unit (ECU) 30 initiates the introduction of fuel into the annular combustor 2 based on predetermined N2 threshold and ignites it at another predetermined N2 via ignition system 10. Light-off of the gas turbine engine 20 is indicated by a rise in MGT within the core (1, 3, 4 and 6). Light-off may be measured in several ways. Non-limiting examples may include using the rate of change of the MGT, the absolute rise in MGT after the introduction of fuel, or it may be merely deemed to have occurred when N2 is greater than a specified percent of its full speed.

After light-off is detected, the control of the gas turbine engine 20 transitions to a rate of speed change (dN2/dt) governor 32, which drives N2 to a pre-programmed idle speed. However, if a maximum MGT start limit is exceeded, the ECU logic 31 will reduce fuel flow from fuel system 40 to maintain MGT within predefined limits while maintaining a minimum dN2/dt. The fuel system 40 driven by the gas turbine engine 20 provides fuel to the engine 20 for proper combustion under all circumstances.

Figure 3:
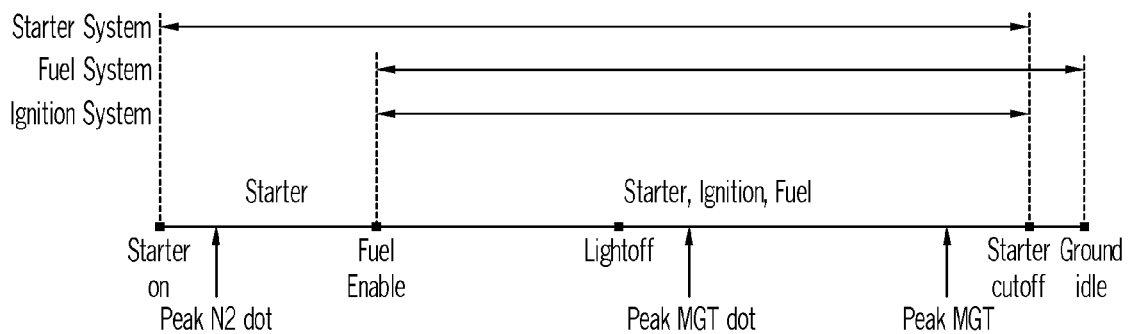
FIG. 3 illustrates the segmentation of the gas turbine start up process according to LRU engagement.
Figure 6:
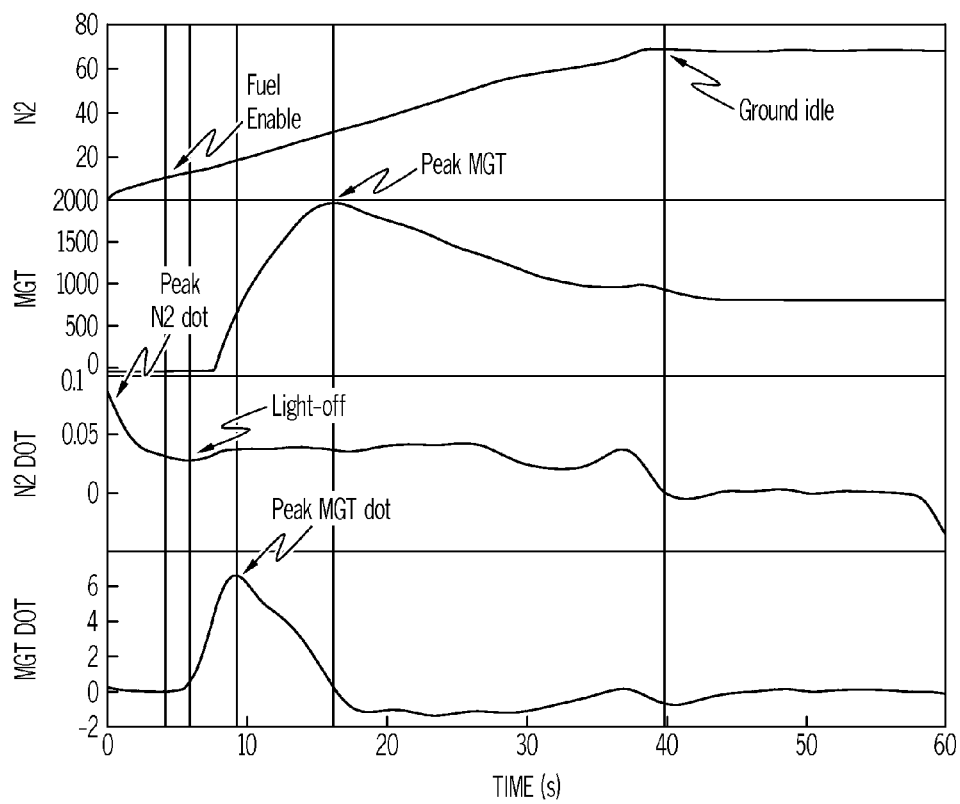
FIG. 6 is an exemplary graph of N2 and MGT over time and their derivatives.

A typical startup procedure includes several critical-to-characterize (CTC) events such as starter on, light-off, peak MGT, and idle as indicated in FIGS. 2, 3 and 6. As each of these states is achieved, different LRUs are engaged and the dynamic response of the gas turbine engine 20 changes. The N2 and MGT are two of the most informative time series indicating whether these states are achieved. Monitoring their time derivatives also provides valuable insights into engine behavior.

When examined against actual startup data, CTC events may be chosen across the N2 and MGT time series profiles as well as across other engine variables depending on the failure type of concern. A non-limiting example of an indication of a CTC event in regard to the N2 and MGT startup transient profile is shown in FIG. 6. This figure helps the chronological understanding of the timing of the CTC events. Notice that the CTC events are regularly, but not equally, distributed between the start event and idle speed. The distance between the events changes as the startup profile changes. However, each variable curve retains its basic shape, thereby allowing an automatic and consistent feature extraction.

In general, an engine start may be commenced by shutting a combined starter/igniter relay (not shown) thereby enabling starter system 60/ignition system 10. The maximum dN2/dt occurs when the engine speed reaches its highest rate of change during startup which usually occurs a few seconds after the starter is switched on. According to commands (e.g. "fuel enable") from the ECU logic module 31, regulated fuel flow may be delivered to a fuel metering unit delivery port of fuel system 40 when N2 exceeds 10% of full speed. The light-off event occurs when ignition successfully completes and the combustor 2 is able to independently sustain combustion. Before N2 reaches 30% of full speed, the igniter(s) 12 typically may complete light-off of the engine 20.

The maximum temperature gradient (peak dMGT/dt) that corresponds to the highest rate of change in MGT follows the light-off event several seconds later. The power turbine 4 then begins to provide rotational energy to the gas turbine engine 20. Peak MGT occurs when the engine reaches its highest temperature during startup. At about 58% engine speed, the starter system and the ignition system are disabled by an ignition/starter relay driver (not shown) that may be executed by the ECU logic 31.

Finally, ground idle occurs when the engine reaches its governed idle speed. One of ordinary skill in the art will recognize that the elapsed time on the y-axis of FIG. 2 and the various threshold levels as disclosed herein depend on the specific engine family being observed and may vary between engine types. Generally, however, the above description of the startup process is true for all types of gas turbine engines.

The conventional state of the art in monitoring the engine startup transient entails sampling various parameters at regular frequencies which are then compared to fixed threshold levels for these parameters. Often, the thresholds are set arbitrarily and usually entail monitoring parameters at 10%, 20%, 30% engine speed, etc. Sometimes the thresholds are set by experts or based on design specifications. In either case, conventional startup transient monitoring does not capture the changes in engine response accurately and in a timely manner, since the anomalies in engine response manifest themselves only at points where the gas turbine engine 20 achieves certain discrete operational conditions during the different phases of the start up transient, and not necessarily as some arbitrary thresholds are reached. However, by storing and analyzing engine sensor data taken only at key operational points during the startup transient, the systems and methods disclosed herein are able to accurately characterize the performance of the engine during the startup process with markedly fewer data points than using many equally spaced time series data.

Referring back to FIG. 3, FIG. 3 illustrates the time periods during a normal start up transient where each of the LRUs is active during the startup process. The LRU time periods may be used to select the proper startup parameters to monitor. For example, a starter system anomaly can be detected and differentiated from other anomalies related to the ignition and fuel systems if the parameters are selected at the point of 'Fuel Enable'. (See FIG. 6). For an ignition system anomaly detection, the events of interest occur at the points of light-off and 'peak dMGT/dt'. Parameters measured at the point of 'peak MGT' and 'idle' are points of interest for the fuel system anomaly detection.

The subject matter disclosed herein monitors the relevant events of the startup transient which can be identified by detecting the dynamic changes in engine operating parameters. This may be done by monitoring an electronic engine control start up schedule 33 executed by the ECU logic 31 to accurately determine the timing of events that are traditionally difficult to pin point, such as the fuel enable event. As can be discerned from FIG. 6, there is no inflection point in any of the monitored parameters at the point of "fuel enable". As such, the "fuel enable" event would be difficult to determine from observation but is still an important transient event. The fuel enable event is significant since the performance of ignition system and fuel delivery system can only be evaluated after this point in time. Unless there is a very accurate fuel flow measurement sensor, which is usually not the case, this timing of this event cannot be precisely and reliably obtained.

To clearly identify the fuel enable event, the ECU logic 31 may be monitored for the various logical inputs required by the ECU logic 31 to subsequently enable a fuel enable output signal. Alternatively, the ECU 31 logic may be monitored for the fuel enable output signal. Other fuel enable indicators may include sensing that a particular relay 41 is shut thereby allowing fuel to flow from the fuel system 40 to the annular burners 2. Similarly, monitoring the position of a valve 42 may be the optimum fuel enable indication. One of ordinary skill in the art will recognize that the specific "fuel enable" indication will vary according to the type and sophistication of the fuel system 40 and the gas turbine engine 20 without deviating from the scope of this disclosure.

By determining the timing of various transient events, the amount of data needed to detect startup anomalies may be reduced. The ability to reduce the data required to characterize engine dynamics from several thousands of high speed data to a few distinct data points per startup has positive implications for engine health monitoring. Further, implementing the data gathering on-board the engine 20 instead of at a ground facility allows real-time data transfer and makes timely prognostics possible.

Figure 4:
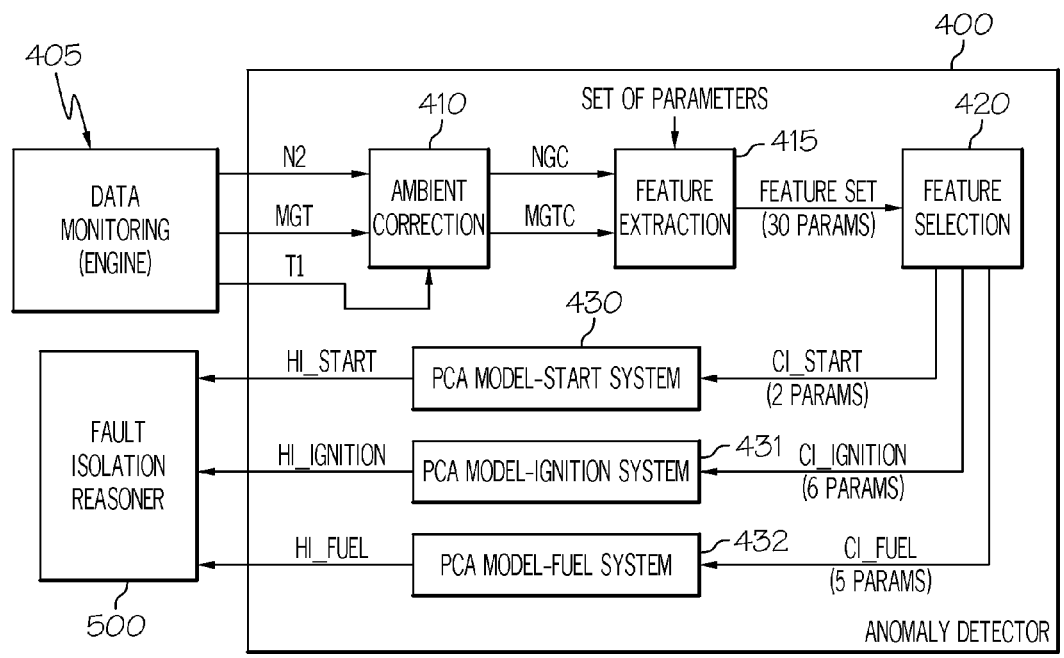
FIG. 4 depicts the operational flow diagram of an anomaly detector from used in conjunction with the start up procedure of FIG. 3.
Figure 5:
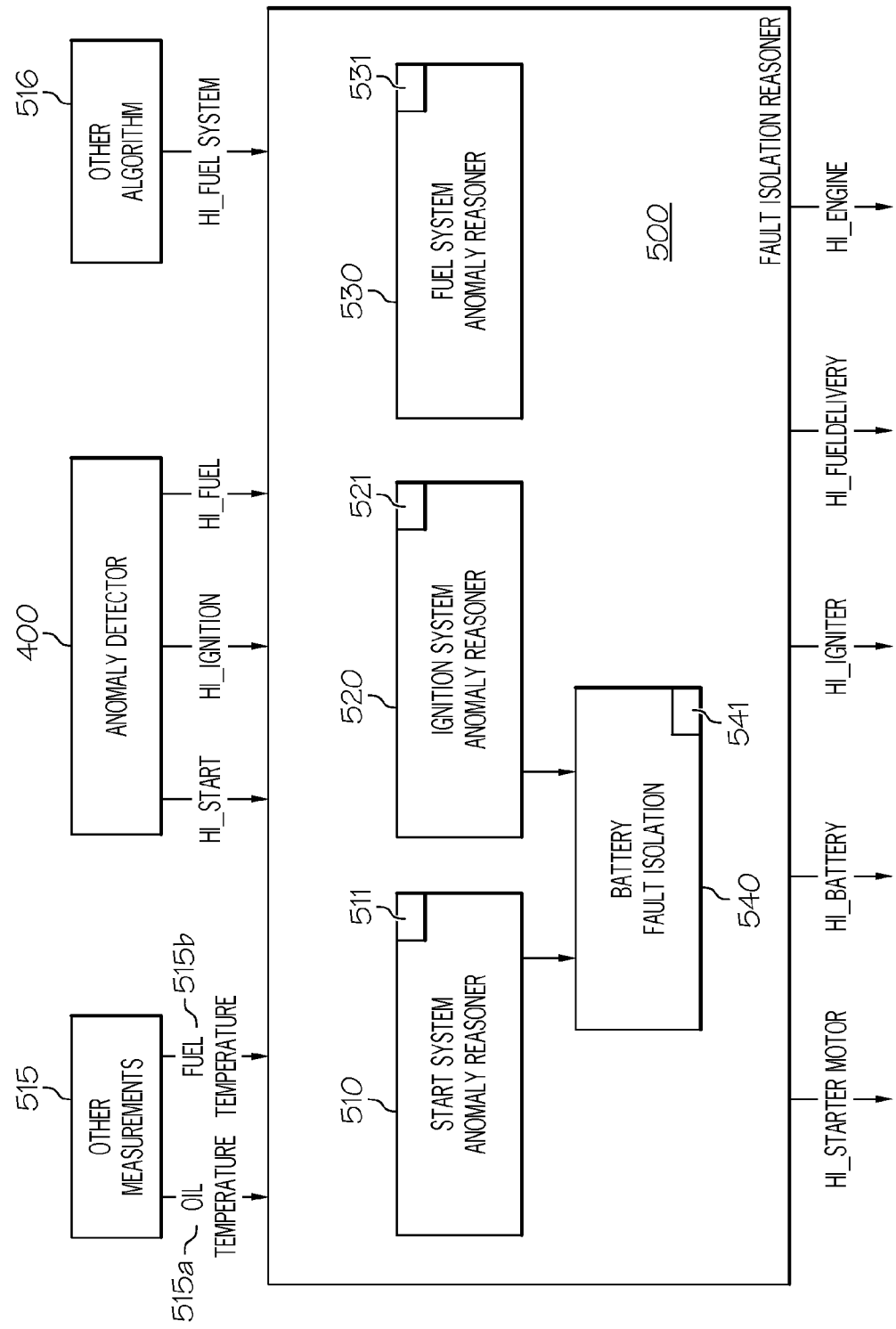
FIG. 5 is a functional block diagram of a Fault Isolation Reasoner.

FIGS. 4 and 5 present functional block diagrams of an exemplary engine fault detection and diagnosis (FDD) system 400 used to monitor the engine startup transient. During the start up transient, various startup features occurring during the transient phase are captured, processed and made available as enriched inputs to various LRU fault isolation modules 510-540. An exemplary, non-limiting time series for startup features N2 and MGT and their derivatives experienced during startup are presented in FIG. 6.

The N2 and MGT parameters and their derivatives are monitored and processed during each start up transient to detect any startup related LRU anomalies. The N2 and MGT startup profiles are continuous time series data. Considering the engine startup transient time, which typically takes 40-50 seconds, the time series consist of a large number of samples. The number depends on the sampling rate (e.g., 2000-2500 samples using a 50 Hz sampling rate).

Instead of analyzing whole time series, the extraction of a few select points that represent each time series is much more efficient even though some information is being discarded. From a practical perspective, there are several advantages to reducing the data by culling a smaller data set. It minimizes the cost and space for data collection and storage and it is computationally faster allowing for timely prognostications. Further, the data can be recorded with equipment that cannot record continuous high speed data. Therefore, a fault diagnosis system based on a reduced data set would require minimal modification of an existing data acquisition system.

FIG. 4 is a logical flow chart depicting a non-limiting, exemplary embodiment of the methods disclosed herein as it pertains to an anomaly detector module 400. One of ordinary skill in the art will appreciate that the anomaly detector module 400 may be implemented with hardware, software, firmware or a combination thereof. The anomaly detector 400 may comprise one or more suitable processors, which may be a single general purpose processor, multiple processors, parallel processors or special single purpose processors. A processor is a computer readable medium. One of ordinary skill in the art will also recognize that steps of the exemplary method may be combined, split and replaced with procedures of similar effect without deviating from the scope of the subject matter disclosed herein.

The anomaly detector 400 extracts data during the startup transient events from a data stream provided from the engine and then provides input to the fault isolation reasoner 500 illustrated in FIG. 5. The data reduction process reduces the data size from the conventional continuous time series data consisting of 2500 samples per parameter (e.g. 50 seconds× 50 Hz) into a data set comprising 2-6 samples.

The first process of the anomaly detector 400 includes data monitoring from the engine 20 at process 405 and the adjustment of the data for ambient temperature at process 410. Because the startup transients of N2 and MGT vary depending on the ambient conditions, an abnormal engine startup can result not only from the malfunctioning engine but also from ambient conditions. Correcting engine parameters for ambient conditions is necessary to decouple data reflecting an anomaly condition from problems resulting from varying ambient conditions. The correction of N2 and MGT is done using the ambient temperature (T1), as is well known to those of ordinary skill in the art.

In the next process 415, a snapshot of a specific sub-set of data points are extracted from the continuous time series data during each of the CTC events that best represent the salient characteristics (e.g. N2 and MGT) of a continuous startup transient and are recorded. The non-limiting, exemplary CTC events discussed herein include, but are not limited to, Peak dN2/dt, Fuel Enable, Light Off, Peak dMGT/dt, Peak MGT, and Idle. At each CTC event, a snapshot of five parameters is taken, resulting in 30 condition indicators (CI) per startup in this exemplary embodiment.

As shown in Table 1, the five parameters are Time, N2, MGT, dN2/dt and dMGT/dt. One of ordinary skill in the art will recognize that the six CTC events and the five parameters described herein (i.e. 30 CIs) are exemplary. To the extent that the machine or process generating the time series is not a gas turbine engine or is a different type of gas turbine engine, other CTC events and parameters may be chosen and in different numbers to produce a different number of CI's.

In some embodiments the CI's that maybe selected for the starter system anomaly detection are the Time at Fuel Enable, and dN2/dt at Fuel Enable. The CIs that may be selected for the ignition system anomaly detection are the time interval between Light-off and Fuel Enable, N2 at Light-off, N2 at Peak dMGT/dt, MGT at Peak dMGT/dt, dN2/dt at Peak dMGT/dt, and dMGT/dt at Peak dMGT/dt. The CIs that may be selected for the fuel system anomaly detection are the time interval between Peak MGT and Light-off, N2 at Peak MGT, MGT at Peak MGT, dN2/dt at Peak MGT, and dMGT/dt at Peak MGT.

TABLE 1

Startup Feature Selection

| Conditions | Parameters | | | | |
| --- | --- | --- | --- | --- | --- |
| | Time | N2 | MGT | dN2/dt | dMGT/dt |
| @ PeakdN2/dt | | | | | |
| @ Fuel Enable | Starter/Igniter | | | Starter | |
| @ Light-off | Igniter/fuel | Igniter | | | |
| @ Peak dMGT/dt | | Ignite | Igniter | Igniter | Igniter |
| @ Peak MGT | Fuel | Fuel | Fuel | Fuel | Fuel |
| @ Idle | | | | | |

At process 420, the 30 CI values are parsed for use in anomaly detection. For anomaly detection within the starter system 60, two CIs are selected from the Fuel Enable event. For anomaly detection within the ignition system 10, six CIs are selected from the fuel enable, light off and Peak dMGT/dt events. For anomaly detection within the fuel system 40, five CIs are selected from the Peak MGT and light off events. However, one of ordinary skill in the art will appreciate that the number and type of CIs selected herein are exemplary and CIs that may be of concern for a particular LRU or for different LRUs may vary between gas turbine engine models and between other machine types.

At processes 430-432, anomalies related to the starter system 60, the ignition system 10, and the fuel system 40 are detected. The anomaly detection may be done using principal component analysis (PCA) modeling as may be known is known in the art. The output of this step is a health indicator (HI) for each LRU indicating whether there exits an anomaly or not. The HIs are then used as an input to the fault isolation reasoner 500. Exemplary, non-limiting examples of the HI may be a digital message, a discrete value associated with a predefined message, a digital flag or a cockpit indication such as an indicator light or audio signal.

PCA modeling converts a number of possibly correlated variables into a smaller number of uncorrelated variables called principal parameters using eigenvector-based multivariate analyses to produce a small training set of uncorrelated variables. The PCA analysis in regard to the subject matter herein is used to develop PCA models that measure the multivariate distance away from the center of the correlation established by a base line case at processes 430, 431 and 432.

Figure 7A:
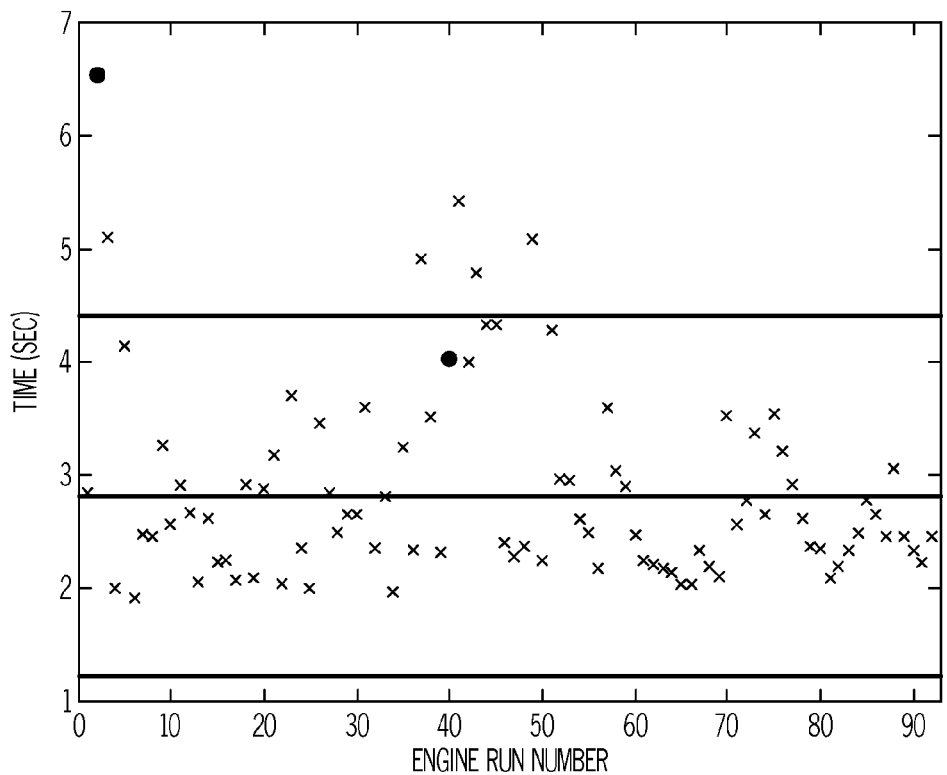
FIGS. 7A and 7B illustrate features selected to detect the starter system anomaly.
Figure 7B:
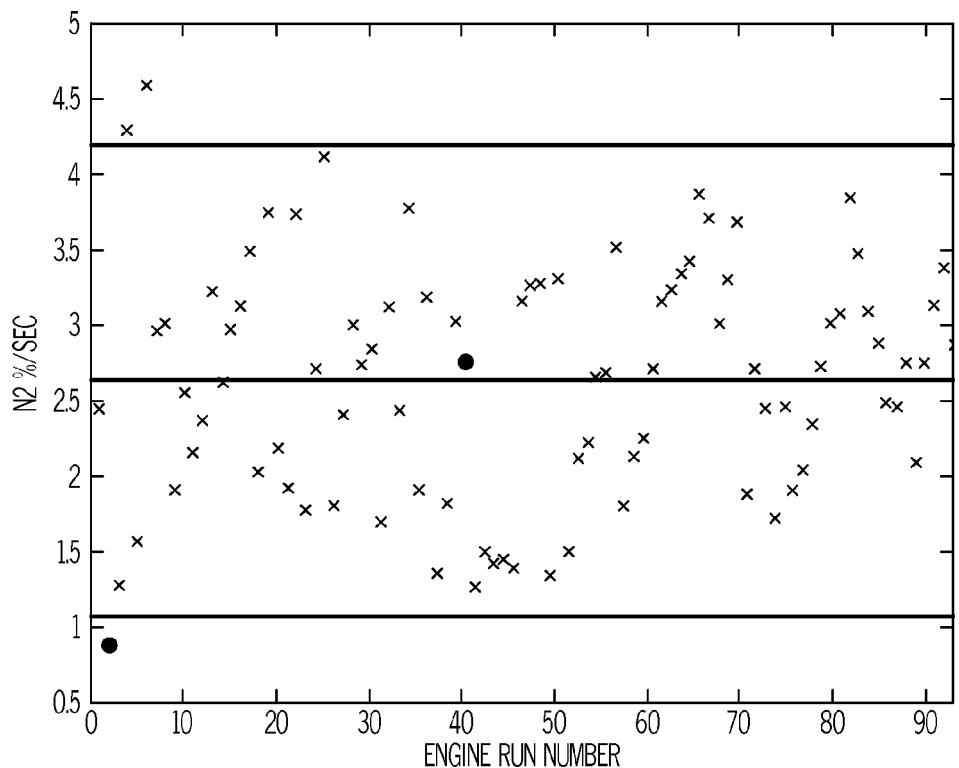
Figure 7C:
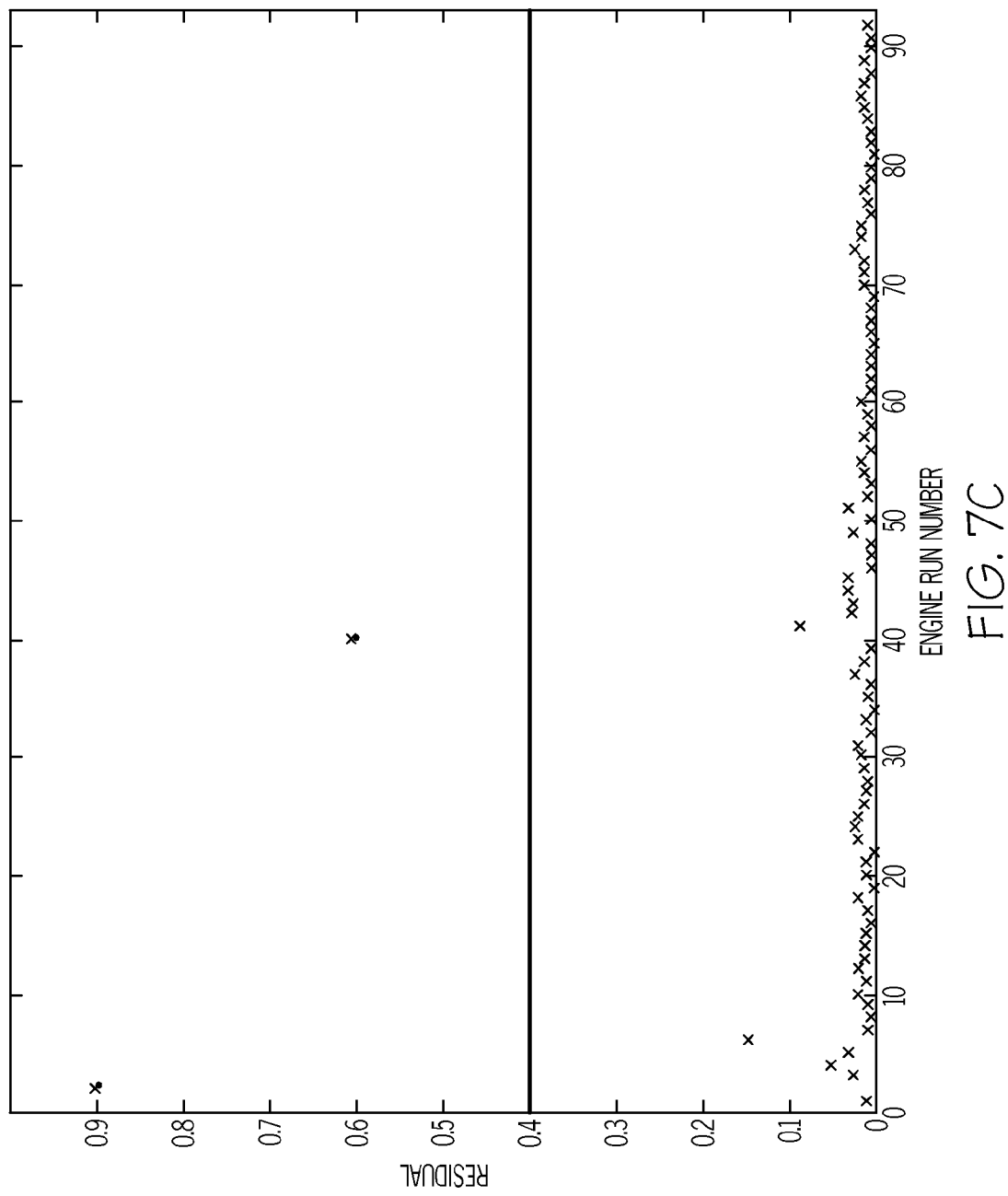
FIG. 7C presents the starter system anomalies detected by a PCA analysis.

Results of starter system anomaly detection are shown in FIGS. 7A-C and 8. FIGS. 7A-B show the two startup CIs selected for the starter system anomaly detection. FIG. 7A shows the Time at Fuel Enable and FIG. 7B shows dN2/dt at Fuel Enable. The x-axis represents a number of startups. A normal startup is marked with an X and an abnormal startup is marked with a dot. FIG. 7C shows the PCA model 430 output for starter system anomaly detection. The horizontal line represents the threshold for the anomaly and an X represents normal case and a dot represents the abnormal case.

Figure 8:
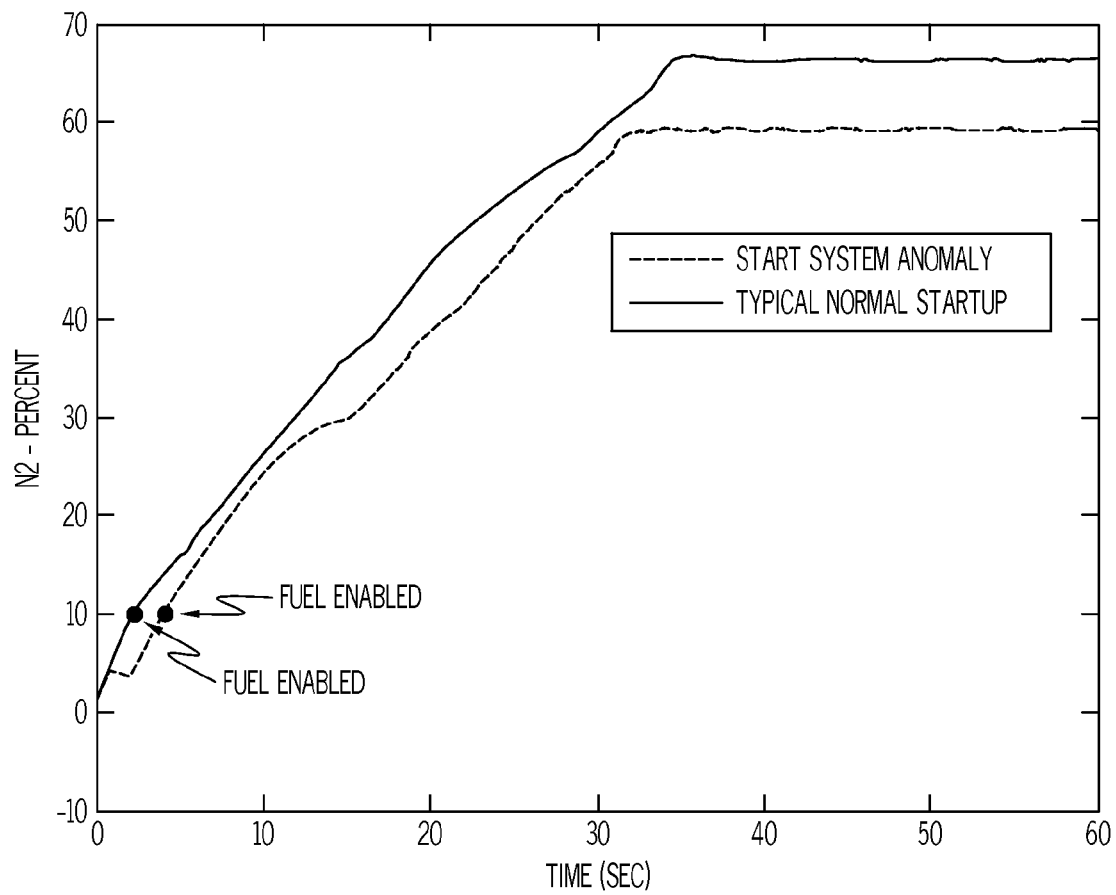
FIG. 8 illustrates an N2 start up profile showing the differences in the case of normal startup and the start up and with the starter system anomaly.

FIG. 8 is the N2 transient profile showing differences in the case of typical normal startup and the starter system anomaly. The two curves are similar to each other except in time where Time to Fuel Enable is larger in anomalous startup. This divergence demonstrates that the starter system anomaly will be detected at the point of Fuel Enable.

Figure 13A:
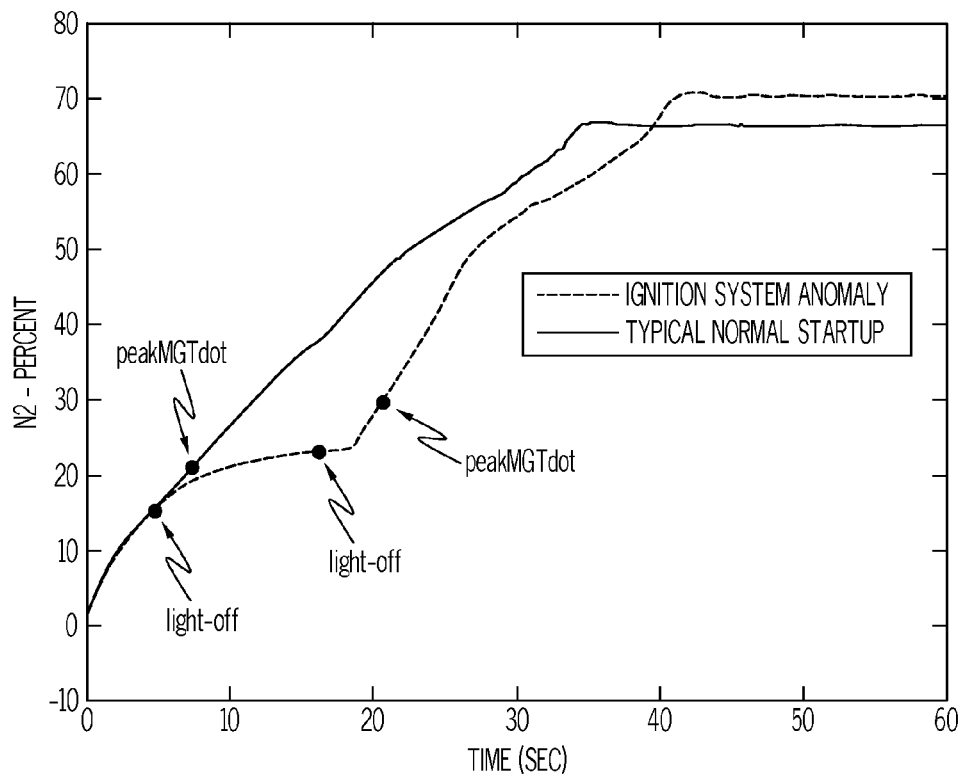
FIGS. 13A-B presents a comparison of time series between normal startups and startups with an igniter system anomaly.
Figure 13B:
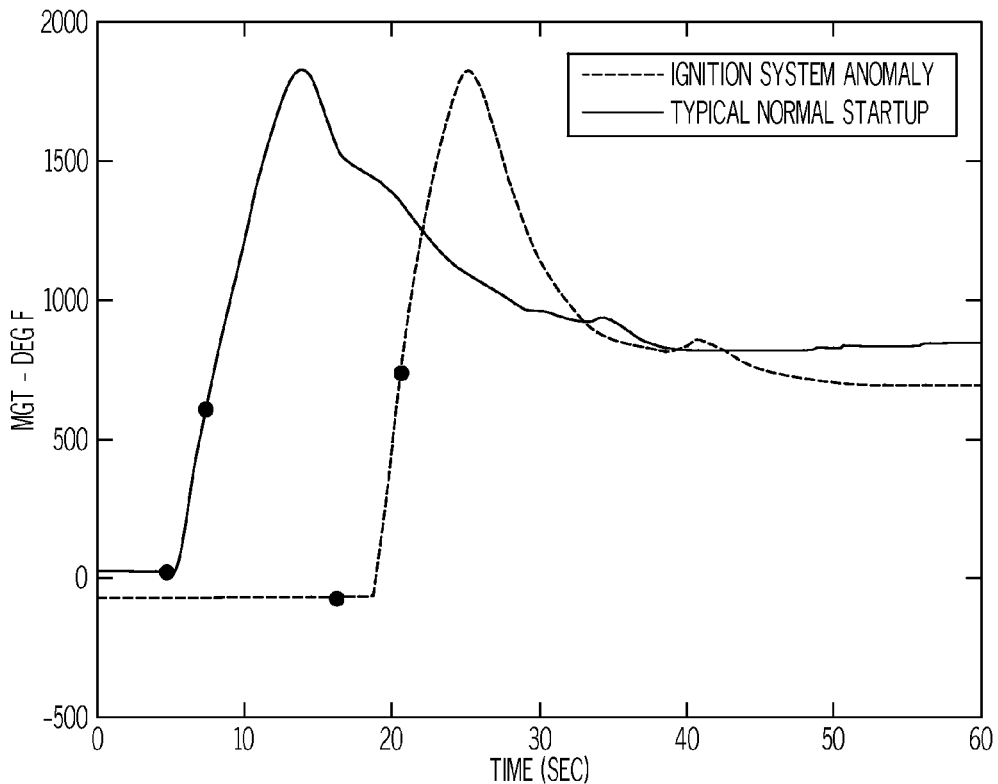
Figure 14A:
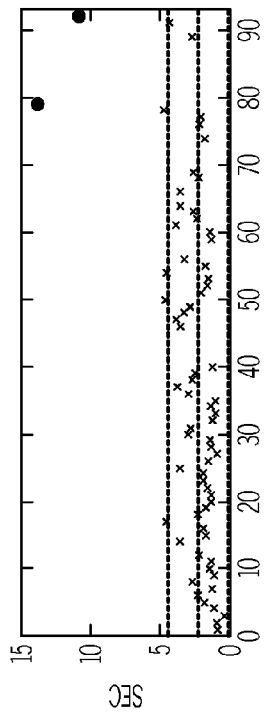
FIGS. 14A-F present the features selected to detect the ignition system anomaly.
Figure 14B:
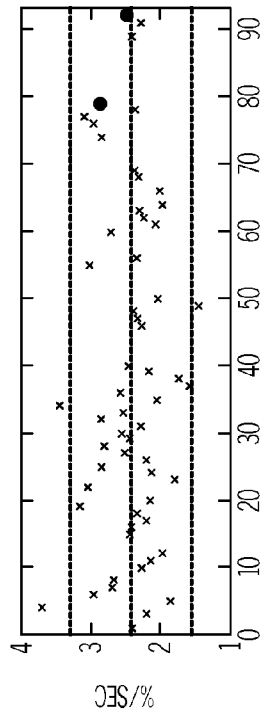
Figure 14C:
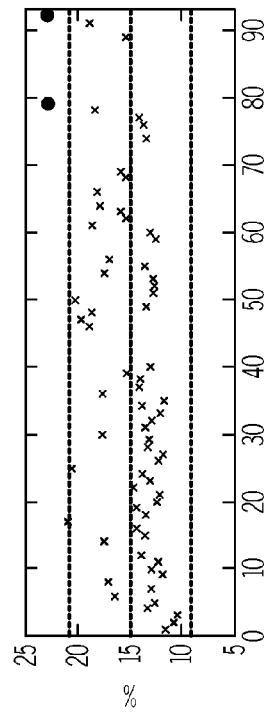
Figure 14D:
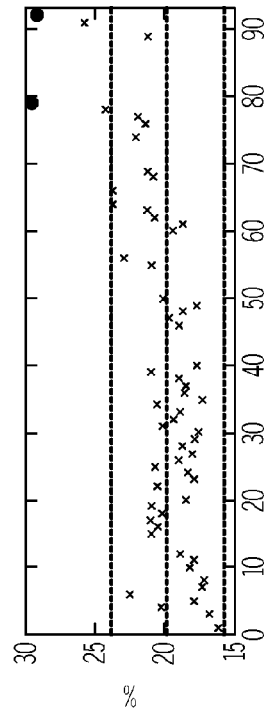
Figure 14E:
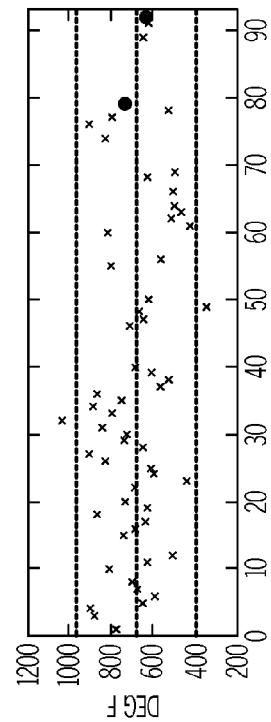
Figure 14F:
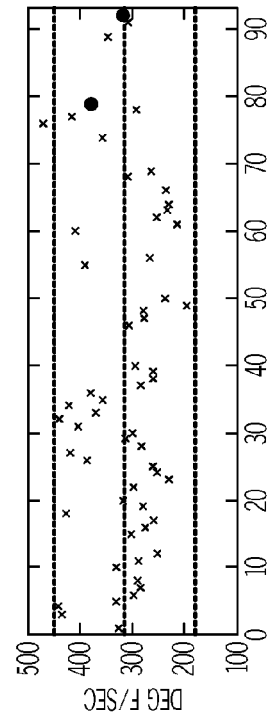
Figure 14G:
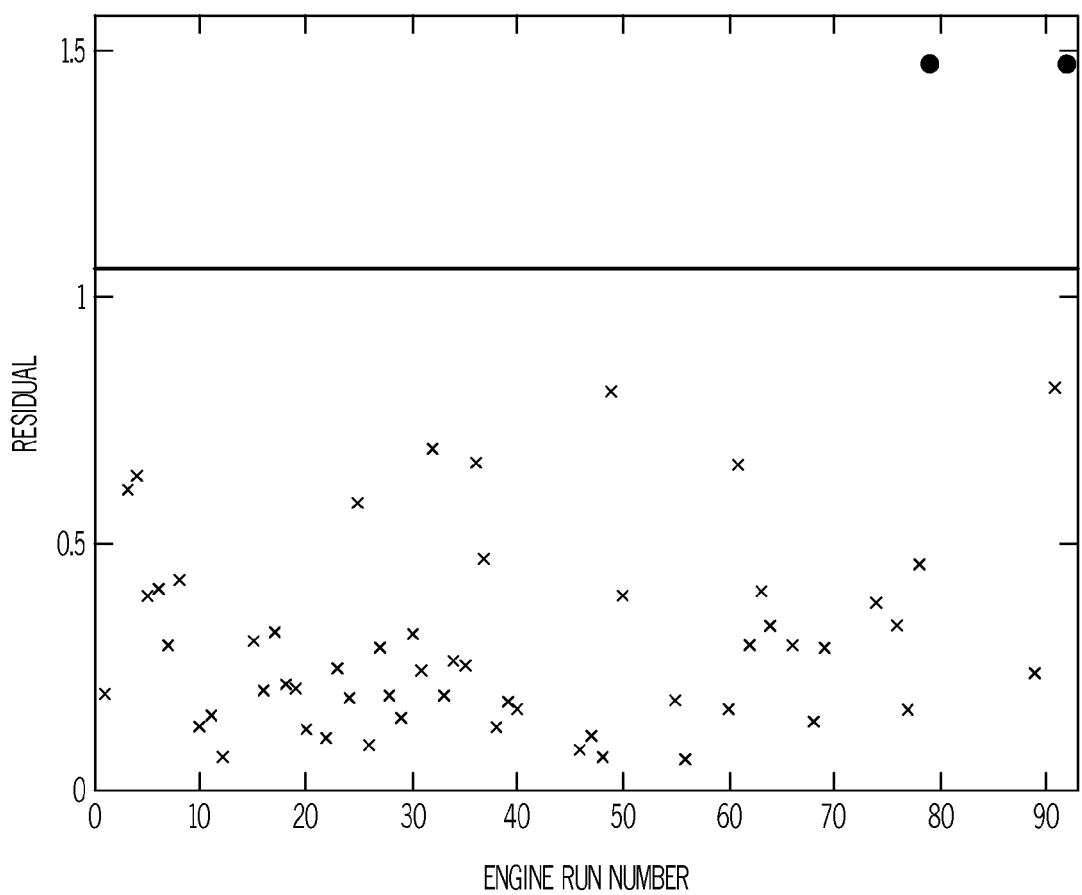
FIG. 14G presents the ignition system anomalies detected by a PCA analysis.
Figure 15A:
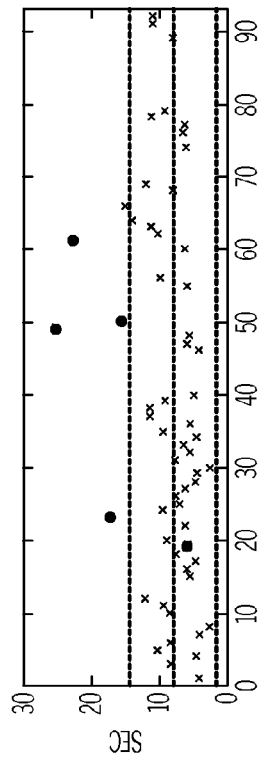
FIGS. 15A-E present the features selected to detect the fuel system anomaly.
Figure 15B:
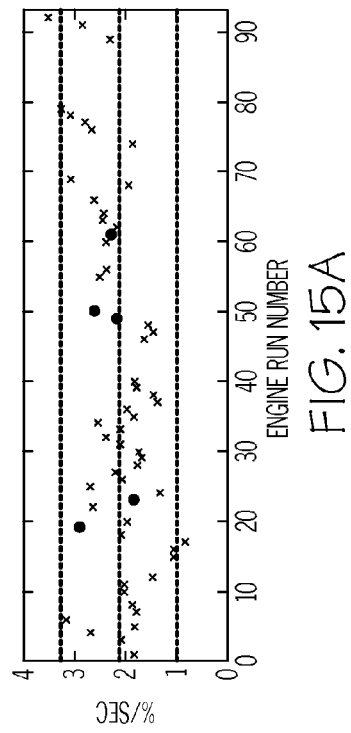
Figure 15C:
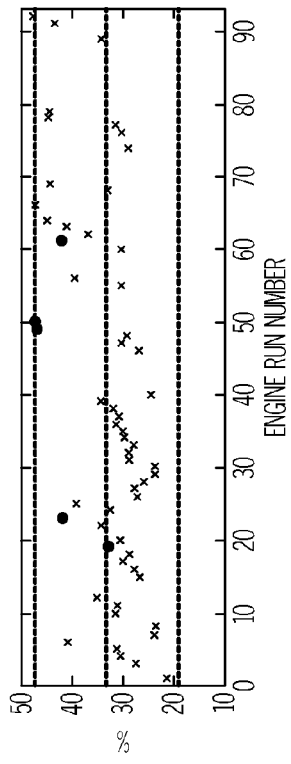
Figure 15D:
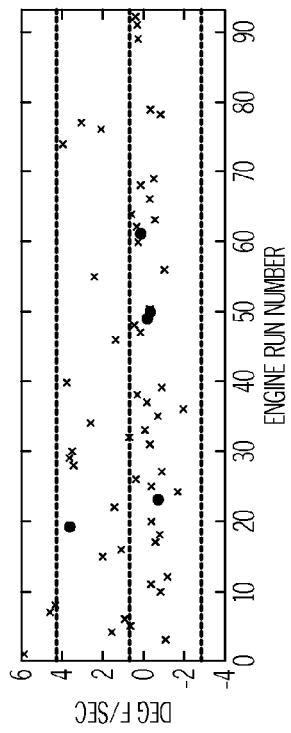
Figure 15E:
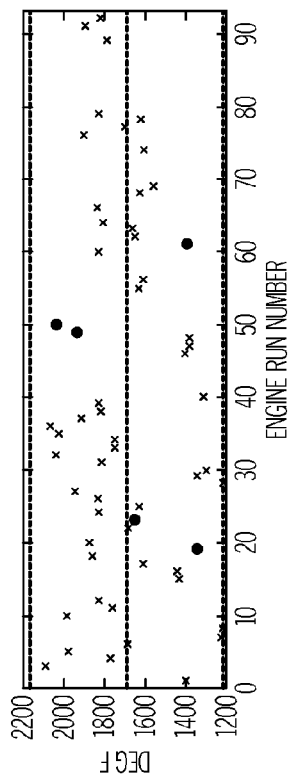
Figure 15F:
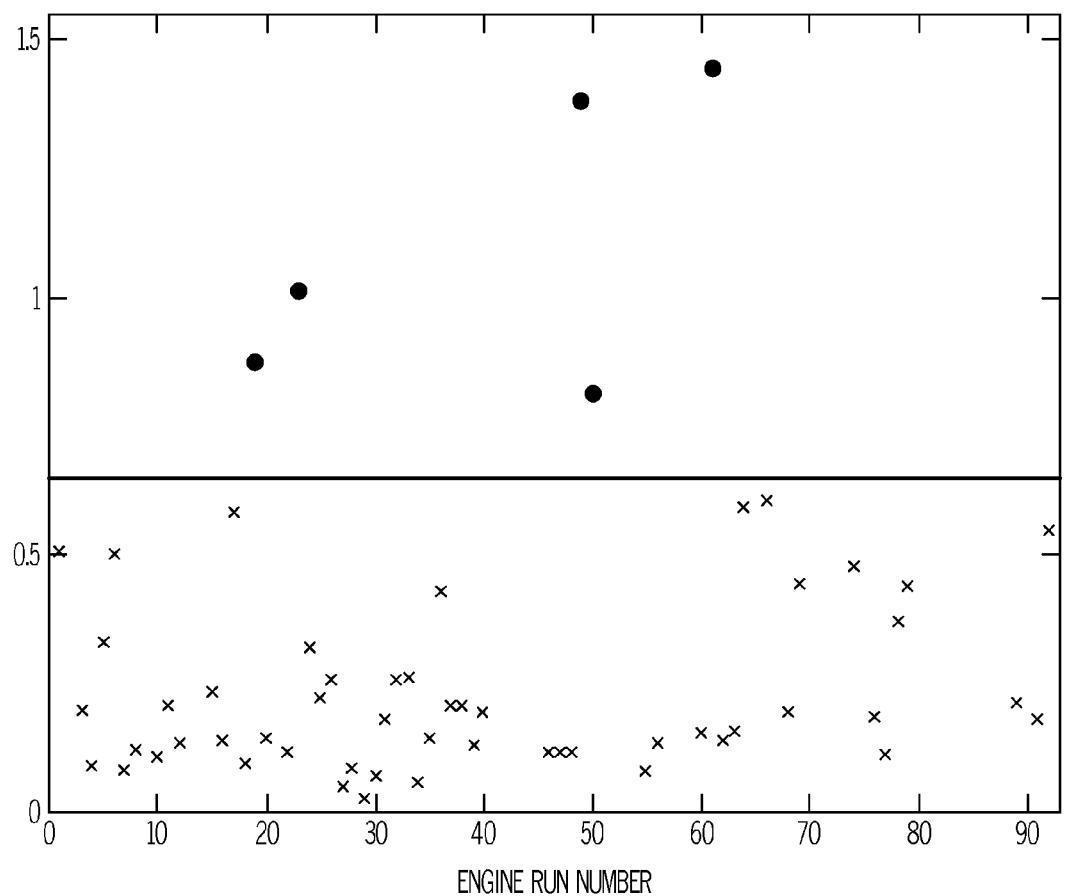
FIG. 15F presents the fuel system anomalies detected by a PCA analysis.

Results of the ignition system anomaly detection module are presented in FIGS. 13-14. FIG. 14 A-F illustrates the six startup features that may be indicative of the of an ignition system anomaly, which are the time interval between Light-off and Fuel Enable, N2 at Light-off, and N2 at Peak dMGT/dt, MGT at Peak dMGT/dt, dN2/dt at Peak dMGT/dt and dMGT/dt at Peak dMGT/dt. The x-axis represents each startup. The normal startup is marked with an X and the abnormal startup is marked with dot. FIG. 14G shows the PCA model 431 output for ignition system anomaly detection. The horizontal line represents the threshold for the anomaly and an X represents normal case and a dot represents the abnormal case. In FIGS. 14 A and D, the time interval between Light-off and Fuel Enable and N2 at Peak dMGT/dt show the most distinguishable signatures between the abnormal and normal startups. FIG. 13 is the N2 and MGT startup profiles showing differences in the case of typical normal startup and the ignition system anomaly. The two curves are similar to each other in the early stage of startup but show the big difference around the Peak dMGT/dt event. This clearly demonstrates that the ignition system anomaly shall be detected at the Peak dMGT/dt event.

Figure 16A:
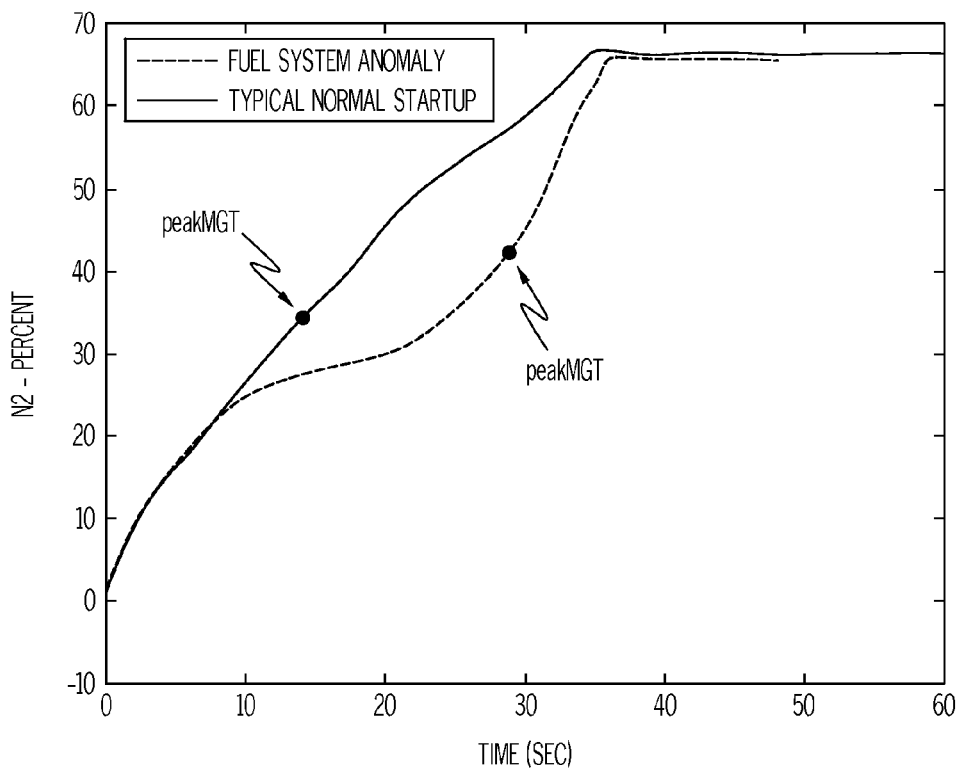
FIG. 16A-B presents a comparison of time series between normal start ups and startups with a fuel system anomaly.
Figure 16B:
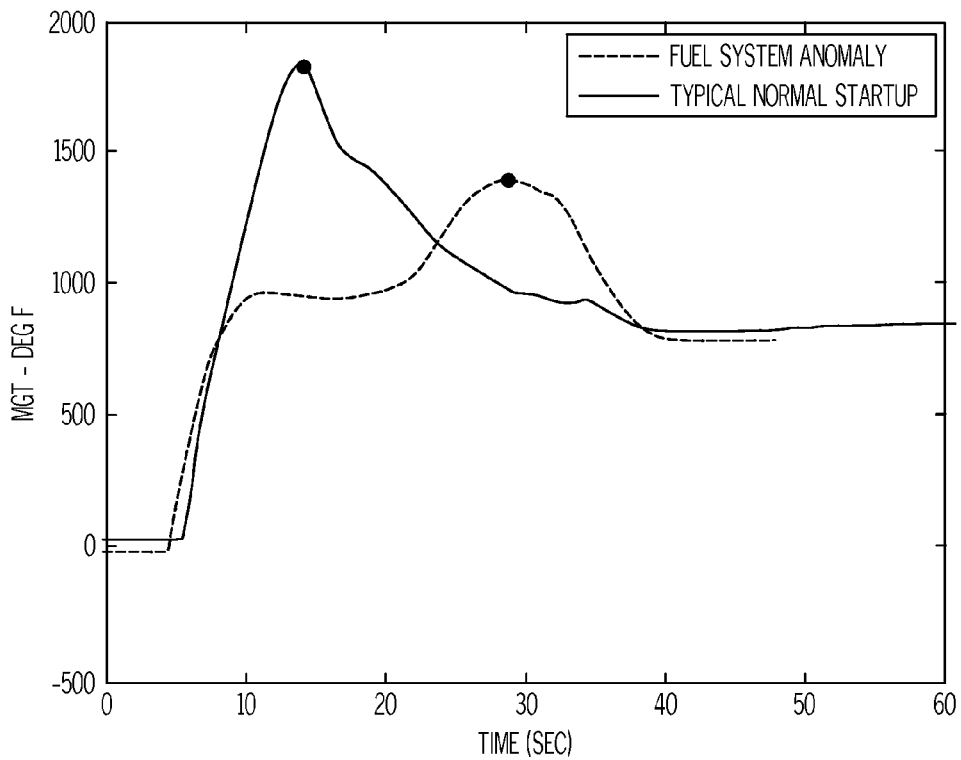

The result of fuel system anomaly detection is shown in FIGS. 15-16. FIG. 15A-E shows five startup features selected for the fuel system anomaly detection—the time interval between Peak MGT and Light-off, N2 at Peak MGT, MGT at Peak MGT, dN2/dt at Peak MGT, and dMGT/dt at Peak MGT. The x-axis represents each startup. The normal startup is marked with an X and the abnormal startup is marked with a dot. FIG. 15F shows the PCA model output for fuel system anomaly detection. The horizontal line represents the threshold for the anomaly and an X represents a normal case. In FIG. 15B, the time interval between Peak MGT and Light-off shows the most distinguishable signatures between the abnormal and normal startups. FIG. 16 illustrates the N2 and MGT startup profiles showing differences in the case of a normal startup and a case with a fuel system anomaly. The two curves are similar to each other in the early stage of startup but show the big difference around Peak MGT transient event. This clearly demonstrates that the fuel system anomaly detected at Peak MGT event.

Although an anomaly is indicated, the root cause of the starter system anomaly may be unknown. An ambiguity set of possible root causes of delayed fuel enablement may include a starter motor fault, a battery fault, engine drag, and engine rub, for example.

FIG. 5 is a functional block diagram for the fault isolation reasoner 500 which may be used to determine the possible root cause of a detected anomaly. The fault isolation reasoner 500 may comprise a series of reasoner modules 510-540. It will be appreciated by those of ordinary skill in the art that the reasoner modules may be implemented by hardware, software, firmware or a combination thereof and would also appreciate at that logic of the reasoner modules 510-540 may be executed by a single or by multiple computing devices or processors as may commonly be known in the art. One of ordinary skill in the art that would also appreciate that processors are computer readable media as are all types of memory devices.

In some embodiments, the fault isolation reasoner 500 may comprise a starter system anomaly reasoner 510, an ignition system anomaly reasoner 520, and a fuel delivery system anomaly reasoner 530. It may also include battery fault isolation reasoner 540. The inputs to the reasoner modules 510-540 are the health indicator values (HI) generated from the anomaly detector 400 (i.e. HI_start, HI_igniter, HI_fuel). In addition, measurements of oil temperature 515a and fuel temperature 515b, and the output from another algorithm 516 detecting fuel system fault are included as inputs in order to differentiate between causes in the ambiguity group. One of ordinary skill in the art will appreciate that other fault isolation reasoner 500 inputs may be substituted or added in other embodiments as may satisfy the requirements of a specific engine or other machine. The outputs of the fault isolation reasoner 500 may be the HIs related to the starter system 60 (HI_Starter Motor), the battery 50 (HI_Battery), the igniter 10 (HI_Igniter), the fuel system 40 (HI Fuel System), and the overall engine 20 (HI_Engine).

Figure 9:
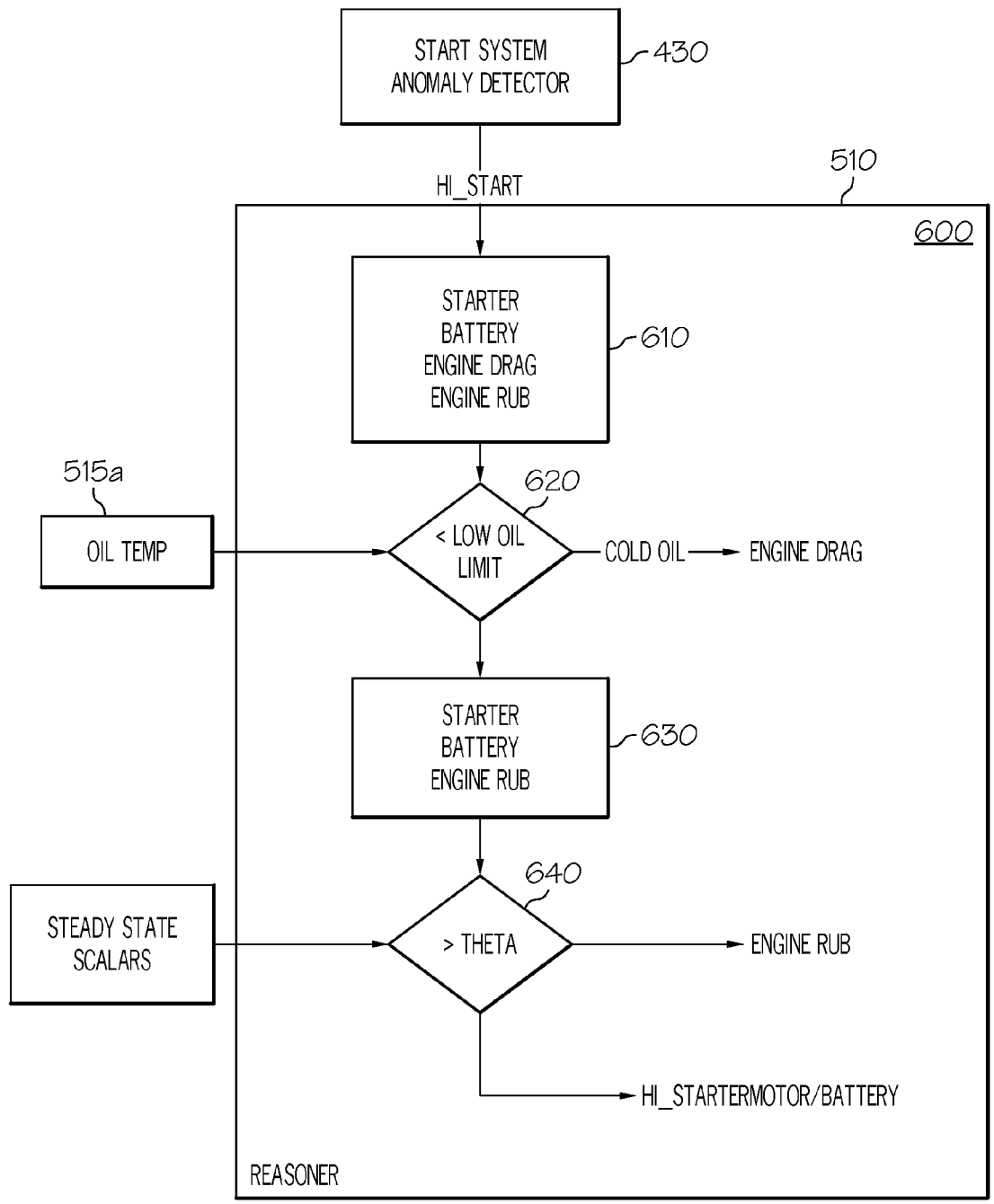
FIG. 9 is an exemplary logic diagram for the starter system anomaly reasoner.

Simplified logic flow diagrams for isolating the root cause of each LRU anomaly are presented below in regards to FIG. 9-12. FIG. 9 presents an exemplary logic flow diagram of the starter system isolation logic 600 that isolates the root cause of a starter system anomaly. At process 610, the HI for the start system (HI_start) is received from the start system PCA model comparison 430 of the anomaly detector 400.

The start system anomaly reasoner 510 contains in a memory 511a pre-defined ambiguity group of all probable start system failures 610. In exemplary embodiments, that ambiguity group comprises a starter system problem, a battery system problem, engine rub and engine drag. At process 620, it is determined whether the engine oil temperature 515a is below a low temperature limit. If so, then the problem is determined to be engine drag. If not then, engine drag is eliminated from the ambiguity group at process 630 and the method continues to process 640 where steady state operational values are read from memory 511 and are compared to like values. If the steady state parameters exceed threshold values "theta" then the method determines that engine rub is the cause of the anomaly. If the stored steady state parameters are less than their thresholds, then engine rub is ruled out of the ambiguity group and the start system anomaly reasoner moves the problem to the battery fault reasoner module 540.

Figure 10:
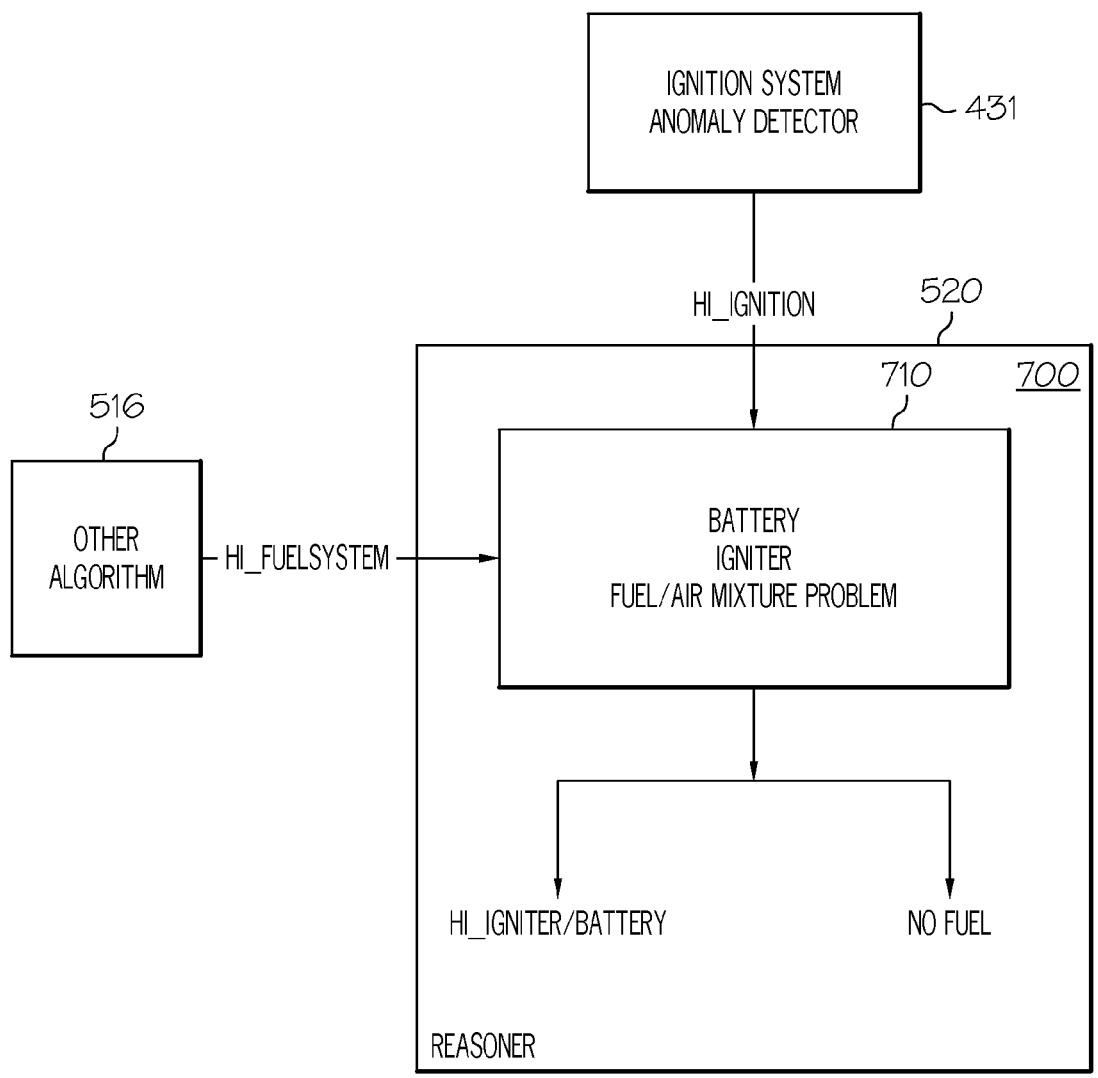
FIG. 10 is an exemplary logic diagram for an ignition system anomaly reasoner.

FIG. 10 presents exemplary ignition system isolation logic 700. According to FIG. 14A, the major anomaly signature is the large time delay of the time between both light off and Peak dMGT/dt events. The root cause of the ignition system anomaly could be various and may be included within an ambiguity group resident in memory 521. The possible root causes in the ambiguity group may be an igniter fault, a battery fault, and a fuel/air mixture problem.

In some embodiments, there may exist another algorithm used to diagnose the various fuel system faults and is beyond the scope of the disclosure. However, this algorithm is based on the performance of control loops by assessing controller dynamics to isolate problems among the igniter sensor, transducer, control logic, or actuator. This algorithm may be referred to as the fuel loop scout algorithm and it can isolate the fault according to the various fuel system components such as the stepper motor, metering valve, rotary variable differential transformer sensor, fuel manifold sensor, and fuel nozzle.

When the ignition system anomaly is triggered by the receipt of the HI-ignition health indicator, the output of the fuel loop scout algorithm is referred to confirm if the anomaly is due to the fuel/air mixture problem at process 710. If the fuel loop scout algorithm does not indicate a fuel/air mixture problem, then the probable root causes of ignition system anomaly are reduced to either a battery problem or to igniter deterioration. In which case the isolation method proceeds to the battery fault isolation procedure illustrated in FIG. 11.

Figure 11:
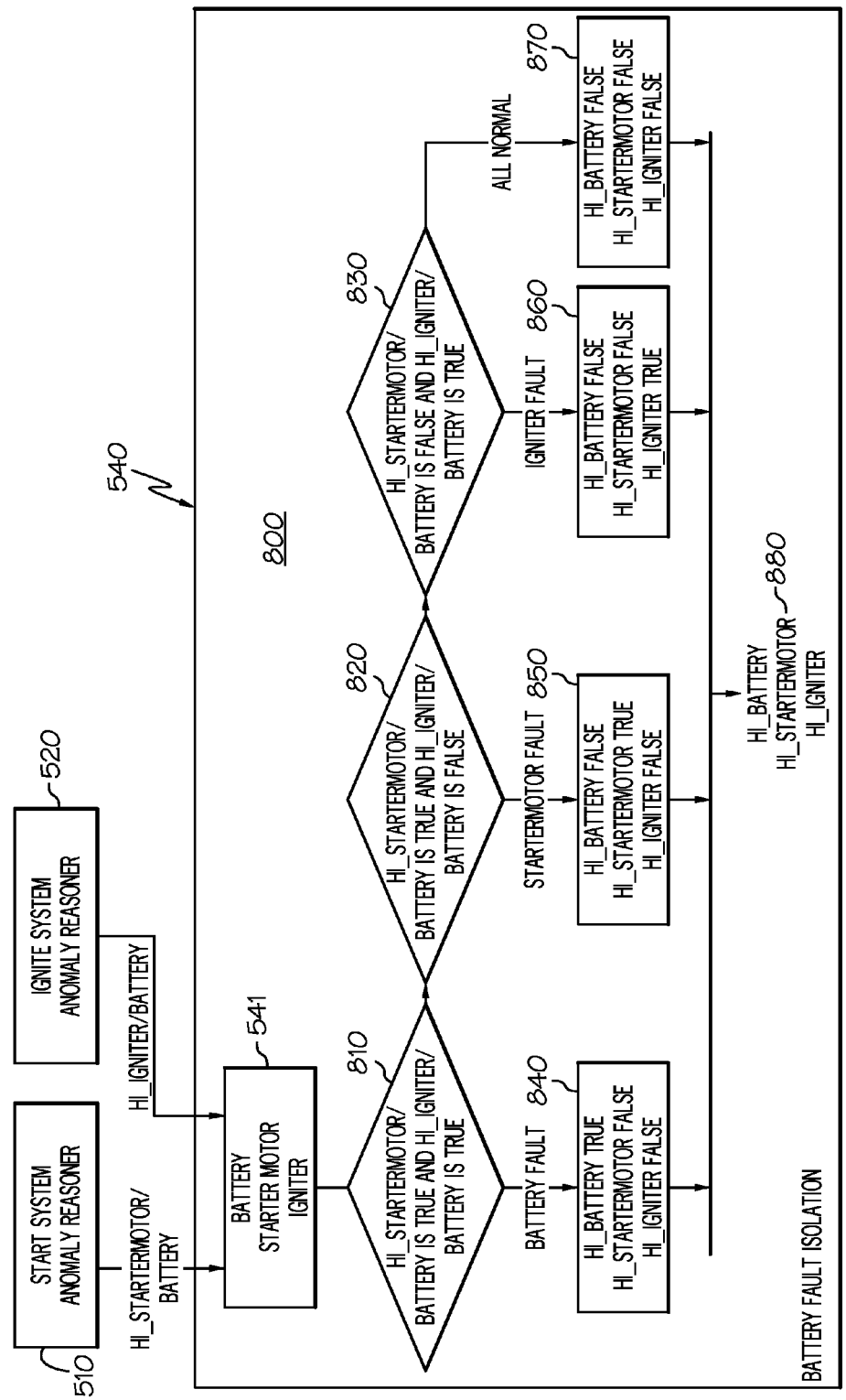
FIG. 11 is an exemplary logic diagram for a battery fault isolation reasoner.

FIG. 11 illustrates exemplary logic 800 to further isolate a battery problem, a starter motor problem, and or an igniter problem. The ambiguity group 541 includes a battery problem, a starter motor problem or an igniter problem. At process 810, if the starter system anomaly reasoner 510 concludes that the anomaly is due to either the starter motor 61 or the battery 50, and the ignition system anomaly reasoner 520 concludes that the anomaly is due to either the igniter 10 or the battery 50, then the probable root cause of both anomalies is the battery, because the starter motor and the igniter are powered by the same battery. As such, a HI_Battery True heath indicator is generated at process 840.

If the starter system anomaly reasoner 510 indicates that the HI_starter motor/battery is true, whereas the ignition system anomaly reasoner 520 indicates that the HI_igniter/battery is false at process 820, then the root cause of the starter system anomaly is the starter motor deterioration and the HI_Starter Motor is set to true at process 850. Similarly, if the starter system anomaly reasoner 510 indicates that the HI_StarterMotor/battery is false, whereas the ignition system anomaly reasoner 520 indicates that HI_igniter/battery is true at process 830, then the root cause of the ignition system anomaly is igniter deterioration by default and the HI-Igniter is set to true. If both HI_startermotor/battery and HI_igniter/battery indicators are set to false then, by default, the Battery fault isolation reasoner indicates all is normal at process 870.

Figure 12:
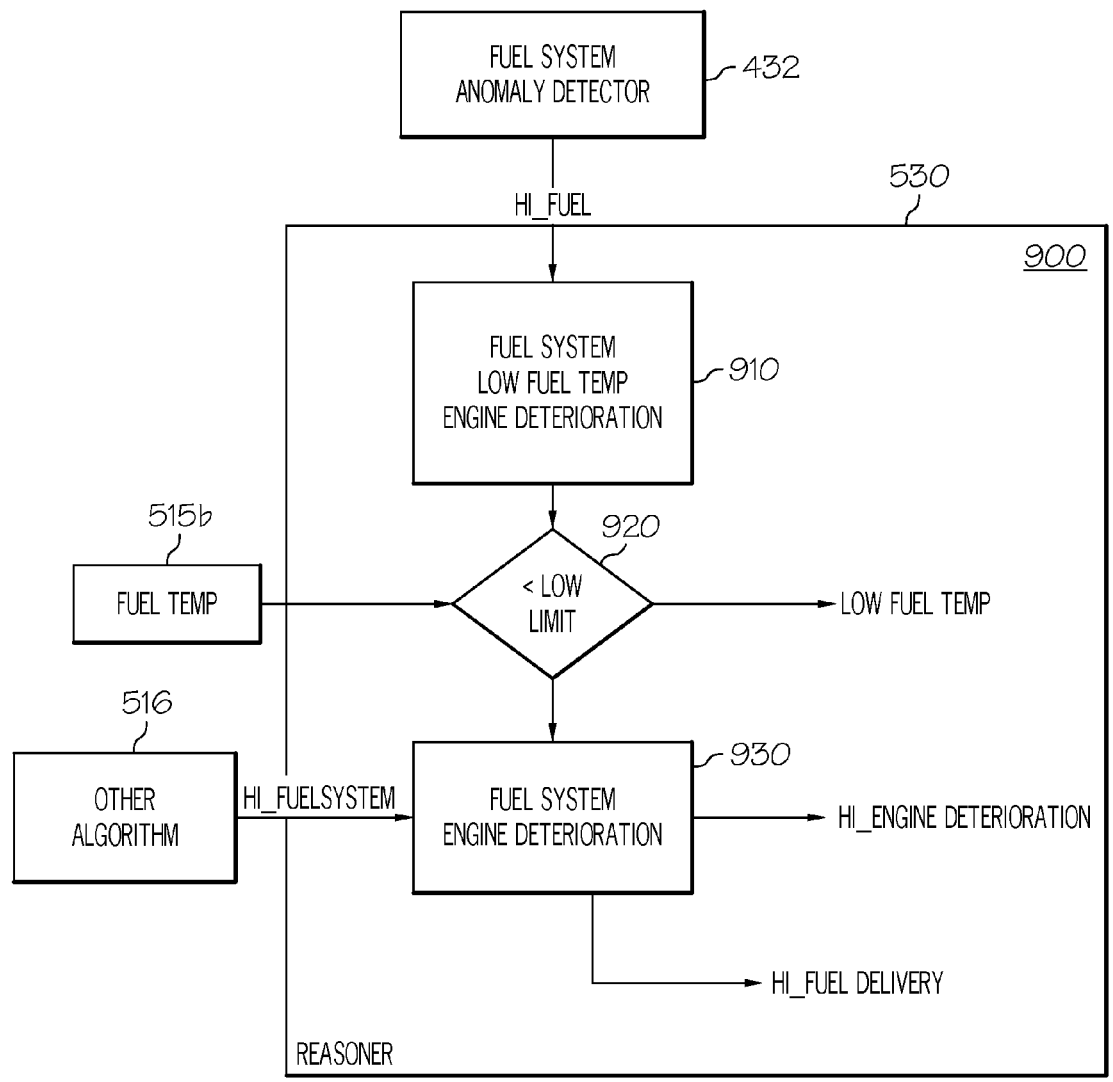
FIG. 12 is an exemplary logic diagram for a fuel system anomaly reasoner.

FIG. 12 presents exemplary logic 900 to further isolate a fuel system anomaly detected by the fuel system anomaly detector 432. The major anomaly signature is a large value for the time interval between Peak MGT and light-off (See FIG. 15B)

The ambiguity group for the fuel system that is stored in memory 531 includes a fuel system problem, low fuel temperature or a deterioration of engine 20. Process 910 receives a value for HI Fuel. At process 920, it is determined if the fuel temperature is low by comparing the fuel temperature 515b to a temperature floor. When the fuel is too cold and the amount of fuel delivered to the combustor 2 is not sufficient, a secondary fuel nozzle (not shown) may begin to open. The size of secondary fuel nozzle may be bigger so the size of the fuel droplet would be bigger. Since the fuel is very cold, the colder and bigger fuel sprayed into chamber 2 results in the cool-down and the possible blown-out. Therefore, if the fuel temperature is below a certain limit, then the probable cause of the delayed Peak MGT is the cold fuel. Similarly, in the case of ignition system anomaly reasoner 700, when the fuel system anomaly is triggered, the output of the fuel loop scout algorithm at process 930 may confirm that the detected anomaly is due to the fuel system deterioration or not. If the fuel loop scout algorithm does not indicate a fuel system problem, then the probable root cause of fuel system anomaly is engine deterioration.

The subject matter described above is provided by way of illustration only and should not be construed as being limiting. Various modifications and changes may be made to the subject matter described herein without following the example embodiments and applications illustrated and described, and without departing from the true spirit and scope of the present invention, which is set forth in the following claims.

What is claimed is:

1. A method for detecting deterioration in an engine component by a computer processor comprising:
    monitoring, by a computer processor, an engine control unit for the execution of a command associated with an occurrence of a start up event;
    recording an engine performance parameter value associated with the start up event at the time the command is executed;
    comparing the recorded engine parameter value with a baseline engine parameter value indicating a normal event;
    determining when the recorded engine parameter value is materially different than the baseline engine parameter value within a predefined standard; and
    when the recorded engine parameter value is materially different that the baseline engine parameter value then generating an anomaly indicator.

2. The method of claim 1, further comprising monitoring the speed (N2) and the measured gas temperature (MGT) of the engine for another event; and
    recording the respective engine performance parameter values of N2 and MGT associated with the other event when the other event occurs.

3. The method of claim 2, wherein the event and the other event comprise at least a partial set of defined events.

4. The method of claim 1, wherein the command is a "fuel enable" command.

5. The method of claim 3, wherein the set of defined events comprise an inflection point in a time series of one of N2 and MGT.

6. The method of claim 3, wherein the set of events comprises an inflection point in the derivative time series of one of N2 and MGT.

7. The method of claim 3, wherein the set of events includes engine light-off, Fuel Enable, Peak dMGT/dt, Peak dN2/dt, Peak MGT and Idle.

8. The method of claim 3, wherein the engine performance parameter includes one of time, N2, MGT, dMGT/dt, and dN2/dt.

9. The method of claim 1 wherein the engine component is one of a battery, a fuel system, a starter system and an ignition system.

10. The method of claim 1 wherein the baseline engine parameter value is determined from a baseline time series using principal component modeling analysis.

* * * * *